United States Patent [19]

Schneider et al.

[11] Patent Number: 5,079,274
[45] Date of Patent: Jan. 7, 1992

[54] PROCESS FOR PREPARING ABSORPTIVE POROUS RESIN BEADS

[75] Inventors: Hans P. Schneider; Yvonne M. Görlach-Doht, both of Stade, Fed. Rep. of Germany; Marius A. M. Kümin, Cham, Switzerland

[73] Assignee: The Dow Chemical Company, Midland, Mich.

[21] Appl. No.: 493,572

[22] Filed: Mar. 14, 1990

[30] Foreign Application Priority Data

Jun. 15, 1989 [GB] United Kingdom ................. 8905934

[51] Int. Cl.$^5$ ............................................. C08J 212/36
[52] U.S. Cl. ..................................... 521/146; 521/31; 521/56; 521/60
[58] Field of Search ................... 521/146, 31, 150, 56, 521/60

[56] References Cited

U.S. PATENT DOCUMENTS

| | | | |
|---|---|---|---|
| 3,686,827 | 8/1972 | Haigh | 55/74 |
| 3,822,244 | 7/1974 | Peyrot | 521/359.3 |
| 4,191,813 | 3/1980 | Reed et al. | 525/330.9 |
| 4,192,920 | 3/1980 | Amick | 521/31 |
| 4,263,407 | 4/1981 | Reed, Jr. | 521/33 |
| 4,358,546 | 11/1982 | Naomi et al. | 521/32 |

FOREIGN PATENT DOCUMENTS

| | | |
|---|---|---|
| 203556 | 10/1983 | Fed. Rep. of Germany . |
| 220964 | 4/1985 | Fed. Rep. of Germany . |
| 220965 | 4/1985 | Fed. Rep. of Germany . |
| 229992 | 11/1985 | Fed. Rep. of Germany . |
| 249190 | 9/1987 | Fed. Rep. of Germany . |
| 1176706 | 7/1970 | United Kingdom . |
| 2113226A | 3/1983 | United Kingdom . |

*Primary Examiner*—Morton Foelak

[57] ABSTRACT

Organic materials, for example halocarbons, hydrocarbons or halogenated hydrocarbons are recovered from fluid streams, such as air or water, by passing these streams over post-cross-linked asdorptive porous resin beads. These beads have been prepared by
(a) haloalkylating cross-linked copolymer beads of i) styrene or an alkylstyrene and ii) divinylbenzene and/or trivinylbenzene,
(b) purifying the haloalkylated copolymer beads,
(c) swelling the haloalkylated copolymer beads in an inert organic liquid and post-cross-linking the swollen beads in the presence of a Friedel-Crafts catalyst. The cross-linked copolymer beads which are used in the haloalkylation step are microporous copolymer beads of i) 99.8 to 98.2 weight percent of styrene or an alkylstyrene and ii) 0.2 to 1.8 weight percent of divinylbenzene and/or trivinylbenzene, based on the total weight of i) and ii).

20 Claims, No Drawings

PROCESS FOR PREPARING ABSORPTIVE POROUS RESIN BEADS

BACKGROUND OF THE INVENTION

The present invention relates to a process for preparing adsorptive porous resin beads and to a method of recovering an organic material from a fluid stream by passing the fluid stream containing the organic material over the adsorptive resin beads.

Organic materials, mainly organic solvents are commonly used in industrial processes. During their use they are often contacted and diluted with air, water or other fluid streams. Recovering such organic materials from the fluid streams is highly desirable in order to avoid environmental problems and in many cases also to recover valuable organic materials which can be reused.

Activated carbon is frequently used for recovering organic materials such as hydrocarbons and halogenated hydrocarbons. Typically, a gas stream, such as air containing such organic materials, is passed through a filter bed containing activated carbon. When the activated carbon is loaded with the hydrocarbons or halogenated hydrocarbons, the activated carbon is regenerated with steam at an elevated temperature. This method has substantial disadvantages. Some halogenated hydrocarbons are cracked in the presence of water and heat. The produced acid such as hydrochloric acid causes severe corrosion problems The steam used for regeneration of activated carbon will become contaminated with the hydrocarbons and has to be purified after the regeneration step Furthermore, the combination of activated carbon, water and heat often destroys the stabilizer which has been added to the halogenated hydrocarbon.

Much research efforts have been spent on the production of cross-linked polymers, typically in the shape of resin beads, for various applications. Some of the cross-linked polymers have been suggested in methods of recovering organic materials from fluid streams Well-known cross-linked polymers are polymers of a vinyl aromatic monomer such as styrene or alphamethylstyrene which are cross-linked with a an oligovinylbenzene such as divinylbenzene or trivinylbenzene.

U.S. Pat. No. 3,686,827 suggests the use of alkylstyrene polymers which are cross-linked with divinyl benzene for removing an organic vapor such as gasoline vapors, methylene chloride or trichloroethylene.

German Offenlegungsschr.frt DE-A-2 027 065 (equivalent to U.S. Pat. No. 3,727,379) suggests the use of polymers of styrene and 2 to 80 weight percent divinylbenzene containing polar groups for removing impurities from gases. The impurities are for example $SO_2$, mercaptans, aromatic, saturated or unsaturated hydrocarbons, alcohols, ethers or amines. The polymers contain halogen, nitro, hydroxyl, ester, aldehyde, keto, amide, nitrile or methylol groups.

U.S. Pat. No. 4,358,546 describes a crosslinked copolymer of chloromethylstyrene and divinylbenzene having from 9.0 to 17.0 mole percent divinylbenzene.

U.S. Pat. No. 3,822,244 describes a process for the cross-linking of polystyrene by chloromethylating the benzene rings of the polystyrene macromolecule followed by methane bridge cross-linking resulting from dehydrochlorination, all carried out in the presence of a nonsolvent for polystyrene (being a solvent for the chloromethyl ether) and a Friedel-Crafts catalyst.

In order to increase the porosity and the adsorbent properties of the aromatic polymer beads people skilled in the art have suggested to prepare slightly cross-linked aromatic polymer beads and to post-cross-link them in the presence of a Friedel-Crafts catalyst.

U.S. Pat. No. 4,263,407 discloses polymeric adsorbents which are of the macronet type and their use for recovering organic solvents from gaseous streams. The macronet type adsorbents are prepared from lightly cross-linked macroreticular (macroporous) beads of polystyrene or a copolymer of styrene and divinylbenzene which have been externally post-cross-linked with a polyfunctional alkylating or acylating agent in the presence of a Friedel-Crafts catalyst. The resins disclosed require the use of the additional external cross-linking agent and exhibit swellability characteristics which result in a loss of physical stability and increased fouling A similar method of adding additional cross-linking is described in U.S. Pat. No. 3,729,457 wherein linking bridges are provided by bifunctional benzyl compounds.

U.S. Pat. Nos. 4,191,813 and 4,192,920 disclose polymeric adsorbents prepared from lightly cross-linked copolymer beads of vinylbenzyl chloride. The lightly cross-linked copolymer beads are post-crosslinked in the presence of a Friedel-Crafts catalyst. Polymeric adsorbent beads of the macronet type are obtained. The same use of the beads is described as in U.S. Pat. No. 4,263,407. The resins are very expensive to prepare due to the high cost of vinylbenzyl chloride.

U.S. Pat. No. 2,629,710 discloses halomethylated styrene polymers cross-linked with 0.5 to 8 percent divinylbenzene. The cross-linked styrene/divinylbenzene copolymers are halomethylated by treatment with chloromethyl ether and a Fridel-Crafts catalyst. During the step of halomethylation, some cross-linking by the halomethylating agent can take place. The halomethylated beads are converted to ion exchange resin beads by reaction with trimethylamine gas. Some of the produced ion exchange resins containing quaternary ammonium groups are highly porous and are useful for adsorbing penicillin.

European Patent Application 152780 discloses a method for increasing the porosity of cross-linked copolymers of mono- and polyvinyl aromatic compounds. The method involves contacting aromatic cross-linked copolymer beads having no halomethyl groups with a Lewis acid catalyst in the presence of an organic solvent. European Patent Application 152780 suggests to use the disclosed resins for removing cephalosporin C from an acidic aqueous solution.

Due to the insufficient physical stability, high protection costs or insufficient (dynamic) capacities of many of these polymeric materials, most of these polymeric materials are not commercially used in methods of recovering organic materials such as halogenated hydrocarbons from fluid streams such as air or water.

DD-A-249,703 discloses a process for producing porous polymeric adsorbents having a surface area of 800 to 1,600 $m^2/g$. In DD-A-249,703 many of the above mentioned teachings are discussed. The inventors of DD patent 249,703 have tried to overcome the deficiencies of the polymeric beads disclosed in the above mentioned teachings. According to their teaching the polymeric adsorbents are prepared by polymerization of styrene and divinylbenzene whereby the copolymer is cross-linked in such a manner that its amount of cross-linking agent is 2 to 8 weight percent divinylbenzene. Chloromethyl groups are then introduced into the copolymer such that the degree of substitution of chloromethyl groups is greater than 0 4 (11.5 percent Cl). The copolymer is washed with an organic solvent, the solvent is removed and the cross-linked polystyrenes are swollen in a halogen-containing hydrocarbon. The swollen copolymers are post-cross-linked in the presence of a Friedel-Crafts catalyst After the end of the reaction the chlorinated hydrocarbon is removed from the product and the product is made hydrophilic. The produced post-cross-linked polymer beads are characterized by a good water absorbance.

As an alternative to the disclosed process, DD-A-249,703 suggests chloromethylating an unfunctionalized cross-linked styrene/divinylbenzene copolymer having 2 to 8 weight percent divinylbenzene and cross-linking the chloromethylated copolymer as described above in a single pot.

DD-A-249,703 mentions that the adsorbent resins produced according to the described process are suitable for adsorbing gaseous, liquid or dissolved solids and are useful for solving waste water, separation and purification problems in the chemical industry.

DD-A-249,274 discloses the same adsorbent resins and the same process for preparing them as DD-A-249,703 The adsorbent beads must be made hydrophilic. DD-A-249,274 discloses the use of the resins for removing harmful materials such as toxins and urea-bonding substances from the body liquids of patients with functional failure of the kidneys or liver.

DD-A-249,194 and DD-A-249,193 suggest the use of hydrophilic adsorbent resins for removing aliphatic, aromatic and/or chlorinated hydrocarbons from hydrogen chloride gas. The hydrophilic adsorbent resins have an inner surface of 800 to 1,600 m$^2$/g. The adsorbent resins are produced by a "special" post-cross-linking of styrene/divinylbenzene copolymers. Neither DD-A-249,194 nor DD-A-249,193 teach how to carry out such a post-cross-linking. "Wofatit Y77" is mentioned as an example of the adsorbent resins. The exhausted beads are desorbed with steam. However, desorption with steam has the above mentioned disadvantages. Some halogenated hydrocarbons are cracked in the presence of water and heat. The produced acid such as hydrochloric acid causes severe corrosion problems The steam used for regeneration purposes will become contaminated with the hydrocarbons and has to be purified after the regeneration step. The purification of the steam does not cause any substantial problems when water-immiscible halocarbons or halogenated hydrocarbons are adsorbed by the resins, however, the main problem connected with waste water purification is caused by those organic materials which are soluble in or miscible with water.

Furthermore, hydrophilic adsorptive resin beads such as those mentioned in DD-A-249,194 and DD-A-249,193 and such as those disclosed in DD-A-249,703 and DD-A-249,274 only have a limited use for recovering an organic material from fluid streams such as water or air. When recovering organic materials from water, hydrophilic adsorbent resins also adsorb water which decreases the adsorbent capacity of the resins for the organic material. Furthermore, the hydrophilic resins tend to swell in water which decreases their adsorbent capacity per volume of resin The adsorption of water also renders the desorption step more difficult. Furthermore, it is very often desired to recover waterless organic materials such as waterless halogenated hydrocarbons from the resins in the desorption step in order to avoid an additional separation step Also when recovering organic materials from air it is undesirable that the adsorbent resins adsorb water vapor from humid air. Some halogenated hydrocarbons are cracked in the presence of water when increasing the temperature in the desorption step. Accordingly, it would be desirable to provide a new process for preparing adsorptive porous resin beads which are useful in a method of recovering an organic material from a fluid stream.

SUMMARY OF THE INVENTION

One aspect of the present invention is a process for preparing adsorptive porous resin beads by
 a) haloalkylating cross-linked copolymer beads of i) styrene or alkylstyrene and ii) divinylbenzene and/or trivinylbenzene,
 b) purifying the haloalkylated copolymer beads,
 c) swelling and post-cross-linking the haloalkylated copolymer beads in an inert organic liquid in the presence of a Friedel-Crafts catalyst,
which process is characterized in that the beads which are haloalkylated are microporous copolymer beads of i) 99.8 to 98.2 weight percent of styrene or alkylstyrene and ii) 0.2 to 1.8 weight percent of divinylbenzene and/or trivinylbenzene, based on the total weight of i) and ii).

Another aspect of the present invention is a method of recovering an organic material from a fluid stream by passing the fluid stream containing the organic material over adsorptive porous resin beads which method is characterized in that the adsorptive porous resin beads have been prepared according to the before mentioned process.

The haloalkylated purified cross-linked copolymer beads are post-cross-linked while in a swollen state by contacting said swollen beads with an amount of Friedel-Crafts catalyst under conditions effective to catalyze the post-cross-linking of the swollen beads. Preferably, the resin beads are chloromethylated copolymer beads of styrene and divinylbenzene monomers.

The post-cross-linked adsorptive resin beads which are produced according to the process of the present invention are characterized by stable, rigid cross-links resulting from internal methylene bridging. Such cross-links result from contacting the swollen haloalkylated copolymer beads with a Friedel-Crafts catalyst. The post-cross-linking in a highly swollen state results in the displacement of polymeric chains (rearrangement) at significant distances from each other. This results in porous resin beads with desirable adsorptive properties.

DETAILED DESCRIPTION OF THE INVENTION

According to the process of the present invention adsorptive and/or absorptive resin beads with hydrophobic properties can be produced, i.e. the resin beads do not adsorb substantial amounts of water and accordingly do not swell in water to a substantial degree.

The haloalkylated cross-linked copolymer beads which are used for post-cross-linking to form the adsorptive porous resin beads are a well-known class of materials as exemplified by U.S. Pat. Nos. 4,297,220, 4,564,644 and 4,382,124 and as illustrated in *Ion Exchange* by F. Helfferich, McGraw Hill, 1962, pp. 60–61.

The cross-linked copolymer is a copolymer of i) from 99.8, preferably from 99.7 and most preferably from 99.5 weight percent to 98.2, preferably to 98.5 and most preferably to 99.0 weight percent of styrene or an alkylstyrene and ii) from 0.2, preferably from 0 3 and most preferably from 0.5 weight percent to 1.8, preferably to 1.5 and most preferably to 1.0 weight percent of divinylbenzene and/or trivinylbenzene, all weight percentages being based on the total weight of i) and ii).

The amount of the divinylbenzene and/or trivinylbenzene is very critical. Divinylbenzene or trivinylbenzene or both are useful for cross-linking the polymer. Divinylbenzene is preferred. However, the total amount of di- and trivinylbenzene must not be more than 1.8 percent, preferably not more than 1.5 percent and most preferably not more than 1.0 percent, based on the total weight of i) and ii). If the cross-linked copolymer contains more divinylbenzene and/or trivinylbenzene, the cross-linked copolymer cannot be sufficiently swollen prior to post-cross-linking which results in a decrease of porosity and surface area of the post-cross-linked microporous adsorptive resin beads.

Useful alkylstyrenes are for example those $C_{1-12}$-alkylstyrenes wherein the alkyl group is bound in the ortho-, metha- or para-position to the benzene ring, such as the methylstyrenes, ethylstyrenes, n-propylstyrenes or isopropylstyrenes or the $C_{4-2}$-alkylstyrenes which are mentioned in U.S Pat. No. 3,686,827, column 1, lines 42 to 55, mainly the tertiary alkylstyrenes such as the tertbutylstyrenes, tert. amylstyrenes, tert. octylstyrenes and tert. dodecylstyrenes but also n-alkylstyrenes such as n-hexylstyrenes. The para-substituted styrenes are the most preferred alkylstyrenes.

Further useful alkylstyrenes are alphamethylstyrene and the alpha-methylstyrenes which are substituted with an alkyl group being bound to the benzene ring as described above.

Preferably the unsubstituted alphamethylstyrene and most preferably the unsubstituted styrene is copolymerized in the polymeric beads.

Cross-linked copolymer beads of styrene and divinylbenzene in the above mentioned weight ratios are most preferably used in the haloalkylating step described below Accordingly the following description refers to styrene/divinylbenzene (DVB) copolymer beads although the scope of the present invention is not limited thereto.

The copolymer beads which are haloalkylated are microporous or "gellular" beads, i.e. beads having an average pore diameter of up to 2.8 nm, preferably from 0.5 to 2.5 nm, more preferably from 1 to 2 nm.

The microporous copolymer beads are made of from 99.8 to 98.2 percent, preferably from 99.7 to 98.5 percent and more preferably from 99.5 to 99.0 percent styrene and from 0.2 to 1.8 percent, preferably from 0.3 to 1.5 percent and more preferably from 0.5 to 1.0 percent divinylbenzene, based on the total weight of styrene and DVB.

The DVB content, i.e. the level of crosslinkages need not be evenly distributed over the entire radius of the resin beads The resin beads can also have a decreased level of cross-linkables in the shell area as compared to the core area. This distribution of cross-linkages is referred to as "core/shell morphology".

By the term "core/shell morphology" it is meant that the polymeric structure of the copolymer beads changes from the inside to the outside of the bead. Such changes in polymeric structure may be somewhat gradual yielding a bead having a gradient of polymeric structure along the radius. Alternatively, said changes in polymeric structure may be relatively abrupt as one moves along a radius of the bead outward from the center. The effect in any case is that these microporous resin beads have a relatively distinct core having one polymeric structure and a relatively distinct shell having another polymeric structure. The core/shell morphology of the copolymer beads is detectable using known analytical techniques such as those mentioned in European patent application 0 101 943. The non-post-cross-linked resin beads may be prepared according to the teaching of European patent application 0 101 943.

The amount of cross-linking, i e. the DVB content, in the shell area preferably is not more than 1.5 percent, more preferably not more than 1 percent, based on the total polymer weight. The amount of crosslinking, i.e. the DVB content, in the core area can be more than 1.8 percent, based on the total polymer weight. Generally, the DVB content in the core area is up to 4 percent, preferably up to 3 percent, based on the total polymer weight However the average amount of cross-linking (DVB content) in the polymer beads is within the above mentioned limits, i.e. from 0.2 to 1.8 percent, based on the total weight of the polymer.

The microporous copolymers may be prepared by conventional suspension polymerization techniques such as those taught in U.S. Pat. No. 4,564,644. Conventional methods of suspension polymerization are also described in Ion Exchange by F Helfferich, published in 1962 by McGraw-Hill Book Company, N.Y., and in U.S. Pat. Nos. 4,419,242 and 4,444,961. The microporous copolymers are characterized by a lack of any significant porosity prior to post-cross-linking when the resin is in a dry state.

In step a) of the process of the present invention the cross-linked styrene/DVB copolymer beads are haloalkylated by introducing into the copolymer beads haloalkyl groups, preferably chloromethyl groups. Methods of chloromethylation of the copolymer beads are well known in the art as illustrated in *Ion Exchange*, supra, p. 53 and U.S. Pat. Nos. 2,642,417; 2,960,480; 2,597,492 and 3,331,602. Typically, the haloalkylation reaction consists of swelling the copolymer beads with a haloalkylating agent, preferably bromomethyl methyl ether, chloromethyl methyl ether, or a mixture of formaldehyde and hydrochloric acid. Most preferably, chloromethyl methyl ether and the copolymer beads are contacted under alkylation conditions in the presence of a Friedel-Crafts catalyst such as zinc chloride, ferric chloride, aluminum chloride or stannic chloride. It is desirable that the halomethylation be carried out under moderate conditions, preferably below 50° C, more preferably between 40° C and 48° C, in order to prevent the formation of methylene bridges between adjacent aromatic rings in a secondary reaction. It is believed that such additional cross-linking diminishes the adsorptive properties of the resin beads used in the method of the present invention.

After haloalkylation of the copolymer beads, the beads are purified (step b) of the process of the present invention). By "purification" is meant removal of the Friedel-Crafts catalyst and the chloromethylating agent as well as removal of water and any oxygenated organic liquid which may have been used as a washing liquor. The Friedel-Crafts catalyst and the haloalkylating agent are preferably removed from the haloalkylated copolymer beads by washing the beads with an oxygenated organic liquid, preferably with an alcohol, ketone or acetal such as methanol, acetone or methylal. It is well known in the art and described in *Friedel-Crafts and Other Related Reactions* by G.A. Olah, published in 1962 by John Wiley & Sons, N.Y. and London, that metal halides (Friedel-Crafts catalysts) complex or react with haloalkylating agents, such as chloromethyl methyl ether, which have become oxygenated and the reaction by-products to form metal halide complexes.

Although it is not fully understood, it is believed that the reaction of the metal halides (Friedel-Crafts catalysts) and oxygenated haloalkylating agents is what necessitates the removal of the Friedel-Crafts complex prior to post-cross-linking. Such metal halide complexes do not have sufficient catalytic activity to promote typical Friedel-Crafts aromatic alkylation reactions such as dealkylation, transalkylation, isomerisations and rearrangement reactions which are needed to increase the expandability of the copolymer and further increase the porosity of the final product. After the wash step water or the above mentioned oxygenated organic liquid is removed from the haloalkylated copolymer beads. For this purpose the beads may be dried in a known way, for example under reduced pressure, increased temperature or simply air-dried, or a distillation may be performed. The distillation may be performed in the presence of an organic swelling liquid Preferred swelling liquids are mentioned below The drying or distillation is carried out under conditions which reduce the amount of oxygenated organic liquids and water to a level that does not deactivate the Friedel-Crafts catalyst used for the post-cross-linking step.

After the purification, the haloalkylated beads are post-cross-linked according to step c) of the process of the present invention. The haloalkylated copolymer beads are swollen in an inert organic liquid. By the term "inert" is meant that the organic liquid does not react with the resin beads or catalyst under process conditions. A wide range of organic liquids may be used, including chlorinated hydrocarbons such as chlorobenzene, ethylene dichloride, methylene chloride, propylene dichloride, and dichlorobenzene or nitro-aromatics such as nitrobenzene. Preferably, the organic liquid employed is ethylene dichloride.

While the haloalkylated copolymer beads are in a swollen state in the organic swelling liquid, a Friedel-Crafts catalyst is added and the swollen beads are post-cross-linked. Preferably, the mixture is heated to a temperature ranging from 20° C. to 180° C. for a period sufficient to post-cross-link the resin, preferably ranging from 0.5 to 30 hours. More preferably, the temperature ranges from 60° C. up to the reflux temperature of the organic swelling liquid and the reaction period ranges from 0.5 to 8 hours. Most preferably, the temperature ranges from 60° C. to 85° C. The reaction temperatures and times may vary depending on the reactive species and catalyst in the reaction mixture.

Any Friedel-Crafts-type catalyst may be utilized to catalyze the post-cross-linking reaction, such as the acidic metal halides including aluminum chloride, stannic chloride, aluminum bromide, boron fluoride, zinc chloride or ferric chloride. The catalyst is typically effective in amounts ranging from 0.001 to 50 percent by weight, based on weight of polymeric material, preferably ranging from 5 to 30 percent by weight. The optimum amount depends upon the reactants and conditions selected for carrying out the reaction.

Following the reaction, i.e., when post-cross-linking is adjudged to be sufficiently complete, the reaction mixture is preferably quenched. The prepared post-cross-linked adsorptive resin beads are then thoroughly washed, preferably first with aprotic organic liquids, for example ketones such as acetone, ethers or acetals such as formaldehyde dimethylacetal, then with protic organic liquids, for example alcohols such as methanol or carboxylic acids, and then with diluted mineralic acids such as diluted aqueous hydrochloric acid, sulfuric acid or phosphoric acid and with water. The post-cross-linked resin beads are then separated from the liquid.

Due to the fact that the post-cross-linked adsorptive porous resin beads produced in the process of the present invention are usually prepared from a styrene/DVB copolymer which has been prepared by a conventional suspension polymerization process, the resin particle size may be controlled over a wide range. Generally the size of the beads may range from 10 to 2,000 micrometers, preferably from 100 to 1,200 micrometers, more preferably from 200 to 600 micrometers.

Generally, the post-cross-linked adsorptive resin beads produced according to the process of the present invention have a surface area ranging from 600 m2/g to 1,600 $m^2/g$, preferably from 1,000 $m^2/g$ to 1,500 $m^2/g$.

It has been observed that, as the degree of post-cross-linking (methylene bridging) increases, the porosity increases. This increase in porosity is believed to be due mainly to the rearrangement of the polymer chains in a swollen state and the methylene bridging of the resin in the swollen state. The increase in surface area as the degree of post-cross-linking (methylene bridging) increases is due to the increase in the number of micropores (pores having a diameter of up to 2.8 nm). The average pore diameter of the post-cross-linked adsorptive resin beads preferably ranges from 0.5 nm to 2 5 nm, more preferably from 1 nm to 2 nm. The post-cross-linked adsorptive resin beads generally exhibit porosities (specific pore volumes) ranging from 0.1 $cm^3/g$ to 1.5 $cm^3/g$ and preferably from 0.5 $cm^3/g$ to 1.3 $cm^3/g$.

Generally, the post-cross-linking of the haloalkylated copolymer beads result in a ratio of methylene bridges to phenyl groups of 0 1 to 0.9:1, preferably of 0.4 to 0.8:1, more preferably of 0.6 to 0.8:1.

Generally, the post-cross-linked adsorptive resin beads produced according to the process of the present invention have an average bead size of 0.3 to 1.2 mm, preferably of 0.4 to 1.0 mm.

The resin beads thus prepared are post-cross-linked, porous adsorptive and/or absorptive resin beads. By the appropriate selection of monomers, swelling solvents, and Friedel-Crafts catalyst, polymers can be obtained with high surface area, high porosity, good physical stability and hydrophobic behavior as discussed more fully hereinbefore.

The above described adsorptive porous resin beads produced according to the process of the present invention are very useful in a method of recovering an organic material from a fluid stream, that is a gaseous or liquid stream.

Exemplary of gaseous streams are oxygen, nitrogen, carbon dioxide or a mixture thereof, such as air, which are mixed with an organic material.

The most common example of a liquid stream is an aqueous stream which contains a dissolved organic material, such as the hydrocarbons, halogenated hydrocarbons or halocarbons mentioned below.

The above described adsorptive porous resin beads are particularly useful for recovering organic materials which are present in very small amounts in the fluid streams, usually less than 5 percent, very often even less than 1 percent by weight of the fluid stream. Accordingly, the adsorptive porous resin beads are very useful in gas and water purification methods.

In the practice of the present invention a fluid stream, for example a gaseous or liquid stream, comprising the organic material is caused to flow through at least one adsorbent bed which comprises the described adsorptive resin beads The resin beads adsorb the organic material The flow of the fluid continues until the content of the organic material in the fluid which flows out of the adsorbent bed exceeds an acceptable level Then the resin beads are subjected to a desorption step. The adsorption and desorption steps may be carried out in any conventional known adsorption apparatus.

The desorption step may be carried out concurrently to the flow of the fluid stream in the adsorption step, however, it is preferably carried out countercurrently.

Preferably, the fluid stream is a gaseous stream at the process conditions. The most important impurities which can be separated from a gas such as air according to the method of the present invention are a) hydrocarbons, preferably having 4 or more carbon atoms, or a mixture of such hydrocarbons such as gasoline, and b) halogenated hydrocarbons, in particular saturated and unsaturated halogenated hydrocarbons having 1 to 3 carbon atoms or aromatic halogenated hydrocarbons.

They may be partially chlorinated or brominated or fluorinated, such as methyl chloride, dichloromethane (methylene chloride), trichloromethane, trifluoromethane, ethyl chloride, 1,2-dichloroethane (ethylene dichloride), 1,1-dichloroethane, 1,1,1-trichloroethane, 1,1,2-trichloroethane, 1,1,2,2-tetrachloroethane, 1,1,2,2-tetrafluoroethane, trichloroethylene, 1,2-dichloropropane, 1,2,3-trichloropropane, trifluoromethane, chlorobenzene or 1,2-dichlorobenzene. To the partially halogenated hydrocarbons, i.e. to the hydrocarbons wherein a portion of the hydrogen atoms is substituted by halogen, also belong chlorofluorohydrocarbons such as chlorodifluoromethane, dichlorofluoromethane 1-chloro-1,1-difluoroethane, 1,1-dichloro-1-fluoroethane, 2-chloro-1,1, or 1,2,2-trichloro-1,1-difluoroethane, bromofluorohydrocarbons and bromo-chlorohydrocarbons.

The halogenated hydrocarbons may be fully halogenated, i.e. all hydrogen atoms may be substituted by halogen Preferred examples thereof are carbon tetrachloride, tetrafluoromethane, perfluoroethane ($C_2F_6$) or tetrachloroethylene (perchloroethylene). To the fully halogenated hydrocarbons also belong chlorofluorocarbons such as dichlorodifluoromethane, trichlorofluoromethane, 1,1,2-trichlorotrifluoroethane, 1,2-dichlorotetra-fluoroethane, 1,1,2,2-tetrachlorodifluoroethane, bromofluorocarbons such as bromotrifluoromethane and bromochlorofluorocarbons such as bromochlorodifluoromethane and bromochlorocarbons.

The adsorption step is preferably carried out at an absolute pressure of at least 0.5 bar, more preferably at least 0.9 bar About atmospheric pressure, that means an absolute pressure between 0.9 and 1.1 bar is very convenient, however, it is often preferred to apply an absolute pressure of more than 1 bar, more preferably of 1 to 2 bar. Preferably, the adsorption step is carried out at a temperature of from $-25°$ C. to $+50°$ C., more preferably of from $10°$ C. to $40°$ C.

The preferred pressure and temperature in the desorption step depends on various factors such as desired time for desorption, the type of organic material and of the specific adsorptive resin beads, the dimensions of the adsorbent beds and the applied desorption step. It is very advantageous that steam is not necessary for desorption of the adsorptive porous resin beads produced according to the process of the present invention. An increased temperature and/or a decreased pressure are sufficient for desorption of the adsorptive porous resin beads.

A temperature of at least $50°$ C., in particular of at least $70°$ C. is preferred in order to achieve a reasonable desorption rate Depending on the organic material to be desorbed, it is preferred to carry out the desorption step at a temperature of no more than $140°$ C. A temperature between $80°$ C. and $120°$ C. is most suitable. Preferably, a vacuum is drawn on the adsorbent bed. An absolute pressure for the desorption step of generally less than about 1 bar, preferably up to 800 mbar, more preferably up to 300 mbar, in particular up to 100 mbar is preferred in order to achieve a reasonable desorption rate. Preferably, the desorption is carried out at an absolute pressure of at least 10 mbar, more preferably at least 40 mbar.

One preferred method in the desorption step makes use of a purge gas, for example air, in order to remove the desorbed organic materials from the adsorption apparatus. It is advisable to maintain the pressure which has been mentioned above for the desorption step. The flow of the inert purge gas stream(s) preferably is from 1 to 40, more preferably from 5 to 15, cubic meter per hour per square meter surface of the adsorbent bed. The flow of the inert purge gas stream(s) may be increasing, decreasing continuous or pulsating and may be started simultaneously with drawing of the vacuum but preferably is started after substantial lowering of the pressure in the absorber. The average flow of the purge gas stream, expressed as volume 9as per time unit, is generally from 0.1 to 15 percent, preferably from 1 to 10 percent and more preferably from 3 to 7 percent of the average flow of the gas stream to be purified Accordingly, the average concentration (partial pressure) of the organic material in the purge gas is much higher than the concentration of the organic material in the gaseous stream to be purified. Due to this high concentration (i.e. high partial pressure), the organic material can be condensed as described below.

The desorbed organic material or the mixture of organic material and inert purge gas is released from the adsorption apparatus and collected by known means. The organic material which is usually gaseous in the desorption step can for example be condensed by cooling the organic material under vacuum, at ambient or increased pressure or by compressing the organic material. For example, halocarbons, hydrocarbons or halogenated hydrocarbons are preferably compressed to a pressure between 1 bar and 5 bar, most preferably between 1 bar and 1.5 bar and they are preferably cooled to a temperature between $-25°$ C. and $20°$ C. The condensed organic material can then be removed and the residual non-condensed organic material which may be mixed with the purge gas can be recycled to the fluid stream to be purified.

It has been found that the post-cross-linked adsorptive porous resin beads produced according to the process of the present invention have surprisingly high adsorption capacities for hydrocarbons and halogenated hydrocarbons, in particular for chlorocarbons, fluorocarbons, chlorofluorocarbons, chlorohydrocarbons, fluorohydrocarbons and chlorofluorohydrocarbons. Furthermore, the beads exhibit low adsorption energies for hydrocarbons and halogenated hydrocarbons and, accordingly, can easily be regenerated (desorbed). In particular, it is not necessary to regenerate the post-cross-linked adsorptive resin beads with steam at a high temperature The unique combination of high adsorption capacities and low adsorption energies for hydrocarbons and halogenated hydrocarbons renders these beads extremely useful for recovering such organic materials. Furthermore, it has been found that these beads adsorb hydrocarbons and halogenated hydrocarbons at a surprisingly high speed. This property is very advantageous because it allows, in combination with the other useful properties, the use of short adsorbent beds. When organic materials are removed from streams which are gaseous at the applied temperature, the length of the adsorbent beds is generally less than about 100 cm, preferably less than about 50 cm and more preferably less than about 30 cm. The use of short adsorbent beds renders the adsorption more cost-efficient. The combination of the above-mentioned properties also allows to reduce the content of hydrocarbons and halogenated hydrocarbons in a gaseous or liquid stream, such as air or water, to a very low residual level in the effluent stream after the desorption step.

The process for preparing the post-cross-linked adsorptive porous resin beads and the method of recovering an organic material from a fluid stream according to the present invention are further illustrated by the following examples which should not be construed to limit the scope of the present invention. Unless otherwise mentioned, all parts and percentages are weight parts and weight percentages.

EXAMPLES

To a 3-necked glass flask equipped with a stirrer, thermometer, and a heating bath containing 1,000 g of distilled water is added 1 g of carboxymethylcellulose. To the mixture with stirring is added 280 g styrene, 4.5 g of technical divinylbenzene of 55 percent purity (0.88 weight percent divinylbenzene (DVB), based on the total weight of styrene and DVB), and 4.4 g of wet benzoylperoxide of 75 percent purity. The mixture is stirred until a stable suspension of droplets of desirable size is formed. The suspension is then heated to a temperature of about 75° C. and maintained at 75° C for about 4 hours. The temperature is then raised to and maintained at about 90° C. for one hour. The suspension is then cooled down to 50° C. The copolymer beads are then filtered off and dried at 100° C.

HALOALKYLATION OF THE COPOLYMER BEADS

To a 2-liter, 3-necked flask equipped with a stirrer, reflux condenser connected to a caustic scrubber, thermometer and a recirculating hot water heating system is charged 150 g of the copolymer beads prepared as described above, 800 ml of chloromethyl methyl ether (CMME) and 50 g of anhydrous ferric chloride. The reactor is heated to 46° C for 215 minutes. After cooling the reactor, the CMME is quenched three times by washing with methanol. The beads are then allowed to stand for two hours after the final methanol wash before filtering and air-drying.

EXAMPLE 1

A) Preparation of the post-cross-linked adsorptive porous resin

To a 3-necked flask is added 70 g of chloromethylated microporous copolymer beads. The flask is equipped with an agitator, reflux condenser, and a vent pipe into a stack. The copolymer is swollen in 250 ml of 1,2-dichloroethane at room temperature. After 30 minutes of swelling, 21 g of anhydrous ferric chloride is added Another 100 ml of 1,2-dichloroethane is added for sufficient agitation. The reactor is heated to and maintained at 70° C. for about 12 hours The mixture is then cooled down and the solvent drained off. The remaininq beads are then treated twice with 100ml of acetone and several washes of methanol. The beads are then washed with 0 5N hydrochloric acid at 20° C. and 0.5 N hydrochloric acid at 50° C for 50 minutes each. After the hydrochloric acid wash, the beads are rinsed with methanol and dried under a vacuum.

The specific surface area of the post-cross-linked resin beads is 1341 $m^2/g$, the porosity (specific pore volume) is 1.07 $cm^3/g$, the average pore diameter is 1.6 nm (80 percent of the beads have a diameter of less than 2.1 nm) and the average bead size is 0.45 mm.

The water adsorption capacity is 3.2 percent, measured according to the same principle as the hydrocarbon described in Examples 3 to 5. An air stream with a flow rate of 135 l/hr is passed through an aqueous saturated solution of disodiumhydrogenphosphate prior to the passage of the air stream through the column containing the adsorptive resin beads. The air stream has a relative humidity of 95 percent.

B) Adsorption of 1,1,1-trichloroethane

A jacketed glass tube 40 cm long and 2.5 cm in diameter with a glass frit on one end is weighed and the weight recorded. To the column are loaded the post-cross-linked adsorptive porous resin beads prepared as described above. The amount of resin beads which are loaded is sufficient to fill the glass tube to a depth of about 10 cm. The loaded column is then weighed again and the weight of the resin beads added is determined as the difference between the weight of the loaded column and the empty column To the top of the column is assembled an air inlet with a flow rate of 215 liters/hr. The column is maintained at a temperature of about 25° C. by a thermostat.

1,1,1-trichloroethane is introduced to the air stream prior to passage through the column by a controlled precision infusion pump with a gas-tight glass syringe The amount of 1,1,1-trichloroethane which is in the inlet concentration is varied from 2,500 vol. ppm up to 11,000 vol. ppm. After passage through the resin bed, the outlet stream is monitored for the 1,1,1-trichloroethane solvent concentration by a Brechbuhl LD monitor and by gas chromatography at the end of the adsorption cycle when the range of the monitor is exceeded. When the inlet and outlet concentration of the 1,1,1-trichloroethane solvent are determined to be equal, indicating that the maximum adsorption capacity of the resin beads has been reached for the particular inlet concentration, the flow of air and 1,1,1-trichloroethane is turned off. The column is then disconnected from the air/1,1,1-trichloroethane source and reweighed after drying off the jacket using acetone and air.

The total capacity of the resin beads in terms of how much solvent is adsorbed is given as percentage, based on the weight of the resin beads.

The results are tabulated for the various inlet concentrations in the following Table.

The required residence time of the air stream in the filled column is less than 1 second. The residence time is herein defined to be the necessary time to reduce the inlet concentration of 5,000 vol. ppm to a concentration which is not detectable by the stated means when passing the air stream through non-exhausted adsorptive resin beads.

EXAMPLE 2

In this Example the adsorptive capacity of the post-cross-linked resin beads prepared according to Example 1 is compared with the adsorption capacities of

| Inlet concentration (volppm) | Percent adsorption Post-cross-linked resin beads |
|---|---|
| 50 | 7.4 |
| 100 | 9.8 |
| 200 | 13.0 |
| 400 | 17.4 |
| 800 | 23.1 |
| 2000 | 33.8 |
| 5000 | 49.3 |
| 7500 | 58.3 | commercially available polystyrene type adsorptive resin beads.

Example 1B is repeated, however, a jacketed glass tube having a diameter of 2.0 cm is used and to the top of the column is assembled an air inlet with a flow rate of 135 l/hr The inlet concentration of 1,1,1-trichloroethane is 6,000 vol. ppm.

The total capacity of the post-cross-linked resin beads of Example 1A is 430 g 1,1,1-trichloroethane per kg adsorptive resin beads (43 percent), determined as indicated above.

The total capacity of polystyrene type adsorptive resin beads, commercially available as Amberlite XAD 4, is 14 percent (comparative run).

The total capacity of macroporous divinylbenzene/ethylstyrene adsorptive resin beads, commercially available as Kastel S 112, is 10 percent (comparative run).

The results of Example 2 illustrate that the adsorptive capacity of the post-cross-linked resin beads used in the method of the present invention is much higher than the adsorptive capacities of conventional, commercially available polystyrene type adsorptive resin beads.

EXAMPLES 3 TO 5

Example 1B is repeated, however, a jacketed glass tube having a diameter of 2.0 cm is used and to the top of the column is assembled an air inlet with a flow rate of 135 l/hr.

A halocarbon or halogenated hydrocarbon is introduced to the air stream as described in Example 1B at an amount of 5,000 vol. ppm in the inlet concentration.

| Example | Organic material | Percent adsorption* |
|---|---|---|
| 3 | Ethyl chloride | 21.6 |
| 4 | Tetrachloroethylene (perchloroethylene) | 72.9 |
| 5 | Dichlorodifluoromethane | 17.3 |

*average values of at least 3 runs

What is claimed is:

1. A process for preparing adsorptive porous resins beads comprising:
   (a) haloalkylating cross-linked microporous beads of a copolymer containing i) from 99.8 to 98.2 weight percent of styrene or alkylstyrene and ii) from 0.2 to 1.8 weight percent of divinylbenzene or trivinylbenzene or both, based on the total weight of i) and ii),
   (b) purifying the haloalkylated copolymer beads, and
   (c) swelling and post-cross-linking the haloalkylated copolymer beads by reaction of haloalkyl groups with aromatic rings in an inert organic liquid in the presence of a Friedel-Crafts catalyst.

2. The process of claim 1 wherein cross-linked microporous beads of a copolymer, containing i) from about 99.7 to about 98.5 weight percent of styrene or alkylstyrene and ii) from about 0.33 to about 1.5 weight percent of divinylbenzene or trivinylbenzene or both, are haloalkylated.

3. The process of claim 1 wherein cross-linked microporous beads of a copolymer, containing i) from about 99.5 to about 99.0 weight percent of styrene or alkylstyrene and ii) from about 0.5 to about 1.0 weight percent of divinylbenzene or trivinylbenzene or both. are haloalkylated.

4. The process of claim 1 wherein cross-linked microporous beads of i) styrene and ii) divinylbenzene are haloalkylated.

5. The process of claim 3 wherein cross-linked microporous beads of i) styrene and ii) divinylbenzene are haloalkylated.

6. The process of claim 1 wherein the adsorptive porous resin beads have an average pore diameter of about 0.5 nm to about 2.5 nm.

7. The process of claim 5 wherein the adsorptive porous resin beads have an average pore diameter of about 0.5 nm to about 2.5 nm.

8. The process of claim 1 wherein the cross-linked microporous beads are haloalkylated in step a) with chloromethyl methyl ether in the presence of a Friedel-Crafts catalyst.

9. The process of claim 5 wherein the cross-linked microporous beads are haloalkylated in step a) with chloromethyl methyl ether in the presence of a Friedel-Crafts catalyst.

10. The process of claim 1 wherein the halogenated copolymer beads are purified in step b) by washing the beads in an oxygenated organic liquid.

11. The process of claim 9 wherein the halogenated copolymer beads are purified in step b) by washing the beads in an oxygenated organic liquid.

12. The process of claim 1 wherein the purified haloalkylated copolymer beads in step c) are swollen in a chlorinated hydrocarbon at a temperature of from about 60° C. to about 85° C. in the presence of an acidic metal halide.

13. The process of claim 11 wherein the purified haloalkylated copolymer beads in step c) are swollen in a chlorinated hydrocarbon at a temperature of from about 60° C. to about 85° C. in the presence of an acidic metal halide.

14. A method of recovering an organic material from a fluid stream by passing the fluid stream containing the organic material over adsorptive porous resin beads wherein the adsorptive porous resin beads have been prepared according to the process as claimed in claim 1.

15. The method of claim 14 wherein the organic material is selected from hydrocarbons and halogenated hydrocarbons.

16. The method of claim 14 wherein the fluid stream is an aqueous medium or air.

17. The method of claim 14 wherein air containing a halogenated hydrocarbon is passed over the adsorptive porous resin beads at a temperature of from about −25° C. to about +50° C. and a pressure of from about 0.5 bar to about 2 bar.

18. The method of claim 14 wherein air containing a halogenated hydrocarbon is passed over the adsorptive porous resin beads at a temperature of from about −25° C. to about +50° C. and a pressure of from about 0.5 bar to about 2 bar and the adsorbed halogenated hydrocarbon is desorbed from the adsorptive porous resin beads at a temperature of from about 50° C. to about 140° C. and a pressure of from about 10 mbar to about 300 mbar.

19. A method of recovering an organic material from a fluid stream by passing the fluid stream containing the organic material over adsorptive porous resin beads wherein the adsorptive porous resin beads have been prepared according to the process as claimed in claim 13.

20. The method of claim 19 wherein air containing a halogenated hydrocarbon is passed over the adsorptive porous resin beads at a temperature of from about −25° C. to about +50° C. and a pressure of from about 0.5 bar to about 2 bar and the adsorbed halogenated hydrocarbon is desorbed from the adsorptive porous resin beads at a temperature of from about 50° C. to about 140° C. and a pressure of from about 10 mbar to about 300 mbar.

* * * * *

UNITED STATES PATENT AND TRADEMARK OFFICE
CERTIFICATE OF CORRECTION

PATENT NO. : 5,079,274

DATED : Jan. 7, 1992

INVENTOR(S) : Hans P. Schneider, Yvonne M. Gorlach-Doht, Mariun A. M. Kumin

It is certified that error appears in the above-identified patent and that said Letters Patent is hereby corrected as shown below:

In Column 14, Line 26, "0.33" should be --0.3--.

Signed and Sealed this

Twenty-second Day of February, 1994

Attest:

BRUCE LEHMAN

Attesting Officer  Commissioner of Patents and Trademarks